US011105468B2

(12) United States Patent
Kemmer

(10) Patent No.: US 11,105,468 B2
(45) Date of Patent: Aug. 31, 2021

(54) METHOD FOR OPERATING A TANK SYSTEM

(71) Applicant: Robert Bosch GmbH, Stuttgart (DE)

(72) Inventor: Helerson Kemmer, Vaihingen (DE)

(73) Assignee: Robert Bosch GmbH, Stuttgart (DE)

(*) Notice: Subject to any disclaimer, the term of this patent is extended or adjusted under 35 U.S.C. 154(b) by 247 days.

(21) Appl. No.: 16/341,303

(22) PCT Filed: Aug. 8, 2017

(86) PCT No.: PCT/EP2017/070091
§ 371 (c)(1),
(2) Date: Apr. 11, 2019

(87) PCT Pub. No.: WO2018/072912
PCT Pub. Date: Apr. 26, 2018

(65) Prior Publication Data
US 2020/0378558 A1   Dec. 3, 2020

(30) Foreign Application Priority Data

Oct. 17, 2016   (DE) .................... 10 2016 220 259.6

(51) Int. Cl.
*F17C 5/06* (2006.01)
*F17C 13/04* (2006.01)

(52) U.S. Cl.
CPC ............... *F17C 5/06* (2013.01); *F17C 13/04* (2013.01); *F17C 2205/0142* (2013.01);
(Continued)

(58) Field of Classification Search
CPC .... F17C 5/06; F17C 13/04; F17C 2205/0142; F17C 2270/0176; F17C 2223/0123;
(Continued)

(56) References Cited

U.S. PATENT DOCUMENTS 5,406,988 A * 4/1995 Hopkins .................... F17C 7/00
123/527
5,615,702 A * 4/1997 Dawans ................. B60K 15/07
137/255
(Continued)

FOREIGN PATENT DOCUMENTS

DE              19933791 A1    2/2001
DE          102004003213       8/2005
(Continued)

OTHER PUBLICATIONS

International Search Report for Application No. PCT/EP2017/070091 dated Nov. 21, 2017 (English Translation, 3 pages).

*Primary Examiner* — Timothy L Maust
*Assistant Examiner* — James R Hakomaki
(74) *Attorney, Agent, or Firm* — Michael Best & Friedrich LLP

(57) ABSTRACT

The invention relates to a method for operating a tank system (10) comprising a number of at least two tanks (21, 22, 23, 24, 25), which are connected in parallel and which contain a gaseous substance, and in which an interior pressure (PX) prevails, for supplying a consumer unit (12), which requires a full load volume of the gaseous substance, wherein each tank (21, 22, 23, 24, 25) has a safety valve (31, 32, 33, 34, 35), which shuts down the tank if a flow volume of the gaseous material through the safety valve (31, 32, 33, 34, 35) exceeds a shut-off volume. If the interior pressure (PX) in at least one tank (21, 22, 23, 24, 25) falls below a first threshold, at least one other tank (21, 22, 23, 24, 25) that was previously shut down is connected.

9 Claims, 4 Drawing Sheets

(52) U.S. Cl.
CPC ............ *F17C 2205/0326* (2013.01); *F17C 2205/0332* (2013.01); *F17C 2221/012* (2013.01); *F17C 2221/033* (2013.01); *F17C 2223/0123* (2013.01); *F17C 2223/036* (2013.01); *F17C 2225/0123* (2013.01); *F17C 2227/042* (2013.01); *F17C 2227/043* (2013.01); *F17C 2260/038* (2013.01); *F17C 2265/065* (2013.01); *F17C 2270/0176* (2013.01); *F17C 2270/0178* (2013.01); *F17C 2270/0184* (2013.01)

(58) Field of Classification Search
CPC .......... F17C 2265/065; F17C 2221/033; F17C 2221/012; F17C 2225/0123; F17C 2270/0178; F17C 2223/036; F17C 2227/042; F17C 2205/0326; F17C 2270/0184; F17C 2227/043; F17C 2260/038; F17C 2205/0332
USPC ............................................................ 141/1
See application file for complete search history.

(56) References Cited

U.S. PATENT DOCUMENTS

| | | | | |
|---|---|---|---|---|
| 5,884,675 | A * | 3/1999 | Krasnov | F17C 5/06 141/18 |
| 7,325,561 | B2 * | 2/2008 | Mathison | G05D 16/2046 137/256 |
| 8,418,732 | B2 * | 4/2013 | Cohen | G05D 11/132 141/9 |
| 8,443,820 | B2 * | 5/2013 | Ulrey | F02M 21/0224 137/1 |
| 10,591,112 | B2 * | 3/2020 | Roberge | F17C 13/04 |
| 2003/0209282 | A1 | 11/2003 | Satou et al. | |
| 2004/0118476 | A1 | 6/2004 | Borck | |
| 2004/0163731 | A1 * | 8/2004 | Eichelberger | F17C 5/06 141/284 |
| 2006/0118175 | A1 * | 6/2006 | Mathison | B60K 15/00 137/256 |
| 2007/0079891 | A1 * | 4/2007 | Farese | F17C 13/026 141/94 |
| 2008/0245437 | A1 * | 10/2008 | Shige | H01M 8/04201 141/4 |
| 2009/0194190 | A1 * | 8/2009 | Casey | F17C 5/06 141/4 |
| 2010/0006596 | A1 * | 1/2010 | Kanie | H01M 8/04955 222/3 |
| 2012/0291902 | A1 * | 11/2012 | Mori | B60K 15/07 138/40 |
| 2012/0318403 | A1 * | 12/2012 | Cohen | F17C 7/02 141/3 |
| 2014/0026991 | A1 * | 1/2014 | Verghade | F17D 1/04 137/561 A |
| 2014/0130938 | A1 * | 5/2014 | Luparello | F17C 5/007 141/69 |
| 2015/0107681 | A1 * | 4/2015 | Killeen | B60K 15/03006 137/12 |
| 2015/0300570 | A1 * | 10/2015 | Beuneken | F17C 5/02 141/4 |
| 2016/0116113 | A1 * | 4/2016 | Mrowzinski | F17C 5/007 141/4 |
| 2016/0305611 | A1 * | 10/2016 | Handa | F17C 13/023 |
| 2017/0102110 | A1 * | 4/2017 | Lomax | F17C 5/06 |
| 2017/0321845 | A1 * | 11/2017 | Luparello | F17C 5/007 |

FOREIGN PATENT DOCUMENTS

| | | |
|---|---|---|
| DE | 102012005689 | 8/2013 |
| EP | 1146277 | 10/2001 |
| EP | 1760388 | 3/2007 |
| GA | 2128819 A1 | 1/1995 |
| GN | 204943038 U | 1/2016 |
| JP | 2003336795 A | 11/2003 |
| JP | 2004239362 A | 8/2004 |

* cited by examiner

METHOD FOR OPERATING A TANK SYSTEM

BACKGROUND OF THE INVENTION

The invention concerns a method for operating a tank system comprising a number of at least two tanks connected in parallel that contain a gaseous substance and in which an internal pressure prevails, for supplying a consumer unit, which requires no more than a full load amount of the gaseous substance, wherein each tank comprises a safety valve, which disconnects the tank if a throughflow amount of the gaseous substance through the safety valve exceeds a shut-off amount.

For supplying consumer units with a gaseous substance, for example a fuel, it is known to connect a plurality of tanks in parallel. The consumer unit is for example a fuel cell system, which requires hydrogen ($H_2$) as fuel. The consumer unit and the tanks are used for example to drive a vehicle, in particular a passenger car or a bus.

The safety devices of a gas tank, for example a hydrogen tank for a fuel cell system, are substantially standardized, for example according to EC 79/2009. According to the standard in this case, there must be a safety valve that ensures that the feed of hydrogen is stopped in the event of excessive extraction. An uncontrolled leak, and thereby an uncontrolled escape of hydrogen, in particular in the event of a broken line, is avoided by this means.

The safety valve thus disconnects the tank if a throughflow amount of the gaseous substance through the safety valve exceeds a shut-off amount. For design reasons, in this case the shut-off amount of known safety valves is not constant but is a function of the internal pressure in the tank. In particular, the shut-off amount increases with increasing internal pressure in the tank.

The shut-off amount of the safety valve is as a rule designed so that the safety valve still does not respond in the event of a full load amount that vis relevant to the fuel cell system under all conditions. In particular, the tank should not be disconnected if the full load amount is extracted at a minimum internal pressure.

Said design of the shut-off amount of the safety valve can result in the safety valve only responding at a multiple of said full load amount at higher internal pressure. A leak that causes a throughflow amount through the safety valve that is greater than the full load amount but smaller than the shut-off amount at the higher internal pressure is thus only noticed after a marked reduction of the internal pressure and the safety valve is closed. Accordingly, leaks are thus not prevented in a timely manner, and relatively large amounts of hydrogen can escape before the tank is disconnected.

SUMMARY OF THE INVENTION

A method for operating a tank system is proposed. In this case, the tank system comprises a number of at least two tanks that are connected in parallel and that contain a gaseous substance, and in which an internal pressure prevails. The tank system is used for supplying a consumer unit, which requires no more than a full load amount of the gaseous substance. In this case, each tank comprises a safety valve that disconnects the tank if a throughflow amount of the gaseous substance through the safety valve exceeds a shut-off amount.

According to the invention, if the internal pressure in at least one tank of the tank system is less than a first threshold value, at least one other tank that was previously disconnected will be connected.

The number of the tanks that are connected and the number of tanks that are disconnected depend on the internal pressure in the tanks in this case. The higher the internal pressure in the tanks of the tank system, the fewer tanks are connected and the more tanks are disconnected.

According to an advantageous embodiment of the invention, if the internal pressure in at least one tank exceeds the first threshold value, at least one other tank is disconnected.

Thus, if the internal pressure in at least one tank of the tank system exceeds the first threshold value, not all tanks are connected to the consumer unit at the same time. In this case the tanks of the tank system are thus not emptied to supply the consumer unit at the same time but in succession.

The shut-off amounts of the safety valves are not constant but increase with increasing internal pressure in the tanks. The shut-off amounts of the safety valves are preferably calculated at a specified minimum pressure that is lower than the first threshold value such that the sum of the shut-off amounts of the safety valves of all the tanks of the tank system at said minimum pressure is greater than the full load amount, which is the maximum that the consumer unit requires.

In this case, the minimum pressure is a parameter of the relevant tank. If the internal pressure in the tank is at least as great as the minimum pressure, emptying the tank to supply the consumer unit is still possible. The tank can thus be operated without problems until reaching the minimum pressure and thereby being emptied.

The tanks of the tank system are usually of the same design and the safety valves of the tanks are also of the same design. The shut-off amounts of the safety valves at the minimum pressure are then calculated in the same way and have an equal value. The sum of the shut-off amounts of all safety valves at the minimum pressure then corresponds to the product of the shut-off amount of a safety valve at the minimum pressure multiplied by the number of tanks.

If the internal pressure in all the tanks of the tank system exceeds the minimum pressure, advantageously at least as many tanks are connected such that the sum of the shut-off amounts of the safety valves of the tanks that are connected is greater than the full load amount. Thus, the consumer unit always has the full load amount available if the internal pressure in all the tanks exceeds the minimum pressure.

The first threshold value is preferably calculated such that the shut-off amount of the safety valve for the first threshold value is greater than the full load amount. Thus if the internal pressure in a tank of the tank system exceeds the first threshold value, then said tank alone can provide the full load amount and can supply the consumer unit.

According to an advantageous embodiment of the invention, therefore if the internal pressure in at least one tank of the tank system exceeds the first threshold value, just one tank, the internal pressure of which exceeds the first threshold value, is connected for supplying the consumer unit. The remaining tanks are disconnected in this case. If the internal pressure in a plurality of tanks exceeds the first threshold value, then one of said tanks is selectively connected.

The tank that is connected is disconnected if the internal pressure thereof is less than the first threshold value. If the internal pressure in at least one other tank of the tank system then exceeds the first threshold value, then another tank, the internal pressure of which exceeds the first threshold value, is connected to supply the consumer unit.

If the internal pressure in all the tanks of the tank system is less than the first threshold value and exceeds a second threshold value in at least two tanks, then exactly two tanks, the internal pressure of which is less than the first threshold value and exceeds the second threshold value, are connected to supply the consumer unit. If the internal pressure in a plurality of tanks exceeds the second threshold value, then two of said tanks are selectively connected.

The second threshold value is preferably calculated such that the shut-off amount of the safety valves for the second threshold value is greater than half the full load amount. As a result, the sum of the shut-off amounts of two safety valves is greater than the full load amount. Thus if the internal pressure in two tanks of the tank system exceeds the second threshold value, then said two tanks together can provide the full load amount and can supply the consumer unit.

The tanks that are connected are disconnected if the internal pressure thereof is less than the second threshold value. If the internal pressure in at least two other tanks of the tank system then exceeds the second threshold value, then two other tanks, the internal pressure of which exceeds the second threshold value, are connected to supply the consumer unit.

The method according to the invention for operating a tank system is advantageously used in a gas-powered vehicle, in particular in a passenger car or in a bus. In this case, the consumer unit is for example a fuel cell system and the tanks of the tank system contain hydrogen ($H_2$), which the fuel cell system requires as fuel. Alternatively, the consumer unit can also be a gas-powered combustion engine and the tanks contain natural gas (Compressed Natural Gas, CNG), which the combustion engine requires as fuel.

In the case of a leak in the tank system, the amount of the escaping gas does not come from all the tanks of the tank system but only from the tanks that are connected. As a result, the throughflow amount through the safety valves of the tanks that are connected that is caused by the leak increases. As a result, in the case of a leak the shut-off amount of the safety valves of the tanks that are connected is exceeded sooner. Thus, with the method according to the invention for operating a tank system, a leak is detected relatively early and the amount of escaping fuel in the event of a leak is significantly reduced.

Nevertheless, the full load amount is always available to the consumer unit if the internal pressure in all the tanks of the tank system exceeds the minimum pressure. By turning on another tank or a plurality of other tanks if the internal pressure in the tank that is connected or in the tanks that are connected is less than a threshold value, it is also guaranteed that the tanks of the tank system are emptied approximately uniformly. As a result, the internal pressure in the individual tanks remains approximately equal in operation.

BRIEF DESCRIPTION OF THE DRAWINGS

Embodiments of the invention are described in detail using the drawings and the subsequent description.

In the figures.

DETAILED DESCRIPTION

Figure 1:
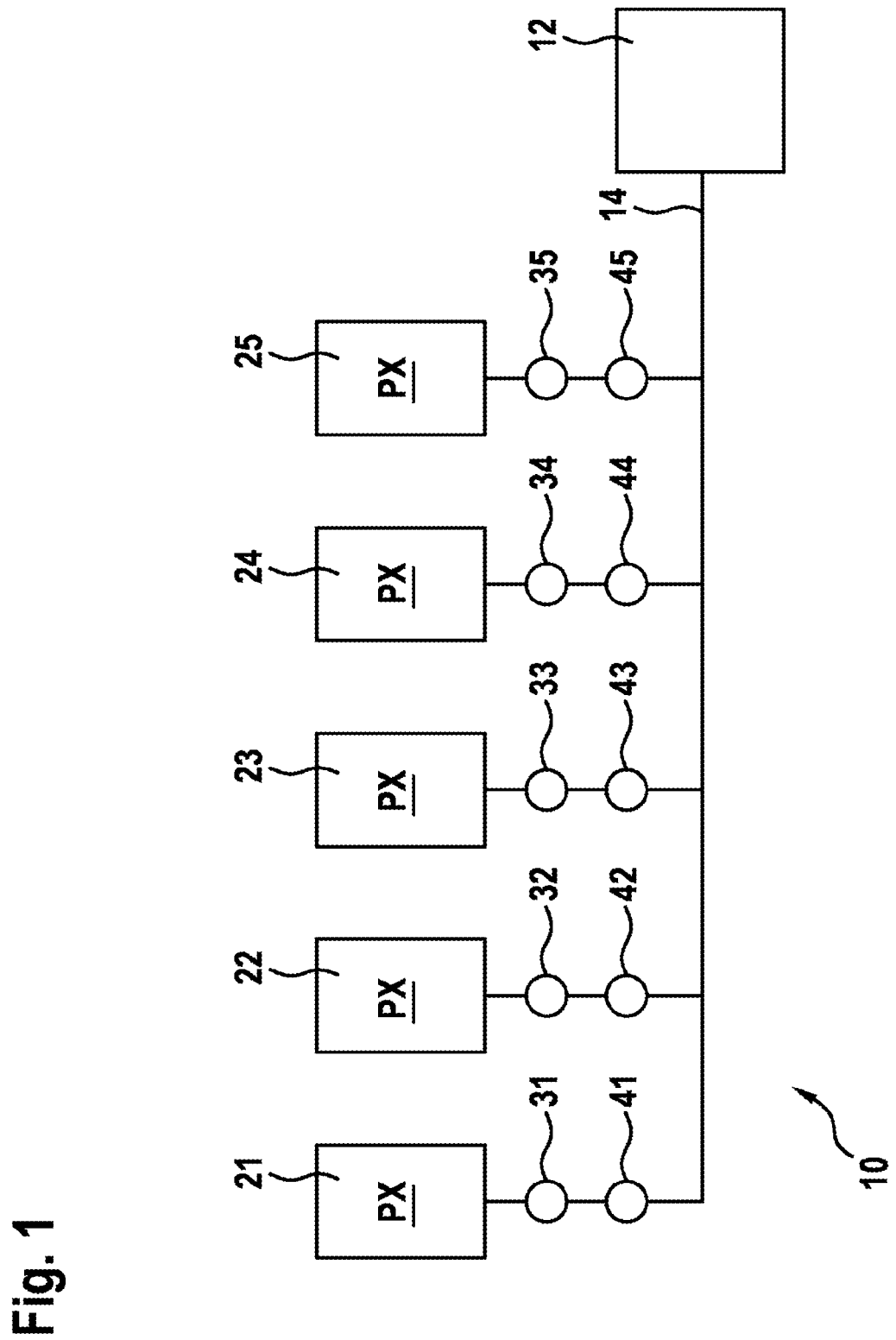
FIG. 1 shows a schematic representation of a tank system connected to a consumer unit.

In the following description of the embodiments of the invention, identical or similar elements are denoted by the same reference characters, wherein a repeated description of said elements in individual cases is omitted. The figures represent the subject matter of the invention only schematically.

FIG. 1 shows a schematic representation of a tank system 10 that is connected to a consumer unit 12. The tank system 10 comprises in the present case a first tank 21, a second tank 22, a third tank 23, a fourth tank 24 and a fifth tank 25. In general, the tank system 10 comprises a number N of tanks 21, 22, 23, 24, 25. N be any whole number greater than or equal to two, in the present case N equals five.

The first tank 21 comprises a first control valve 41 and a first safety valve 31. The second tank 22 comprises a second control valve 42 and a second safety valve 32. The third tank 23 comprises a third control valve 43 and a third safety valve 33. The fourth tank 24 comprises a fourth control valve 44 and a fourth safety valve 34. The fifth tank 25 comprises a fifth control valve 45 and a fifth safety valve 35.

The tanks 21, 22, 23, 24, 25 contain a gaseous substance, in the present case hydrogen ($H_2$), which is under pressure. An internal pressure PX thus prevails in each of the tanks 21, 22, 23, 24, 25. The tanks 21, 22, 23, 24, 25 are connected in parallel and are connected to a collecting line 14. The collecting line 14 is also connected to the consumer unit 12, which in the present case is a fuel cell system. By means of the collecting line 14, the consumer unit 12 can be supplied with the gaseous substance from the tanks 21, 22, 23, 24, 25 of the tank system 10.

By means of the control valves 41, 42, 43, 44, 45, which in the present case are embodied as solenoid valves, the tanks 21, 22, 23, 24, 25 can be connected and disconnected mutually independently. In this case, a tank 21, 22, 23, 24, 25 is connected if it is connected to the collecting line 14 and thus also to the consumer unit 12. A tank 21, 22, 23, 24, 25 is disconnected if it is not connected to the collecting line 14 and the consumer unit 12.

The safety valves 31, 32, 33, 34, 35 disconnect the respective tank 21, 22, 23, 24, 25 if a throughflow amount of the gaseous substance through the safety valve 31, 32, 33, 34, 35 exceeds a shut-off amount MA. The safety valves 31, 32, 33, 34, 35 disconnect the respective tank 21, 22, 23, 24, 25 in particular if the throughflow amount is greater than the shut-off amount MA because of a leak, for example in the collecting line 14. The shut-off amount MA of the safety valves 31, 32, 33, 34, 35 is not constant but is a function of the internal pressure PX of the tanks 21, 22, 23, 24, 25.

Figure 2:
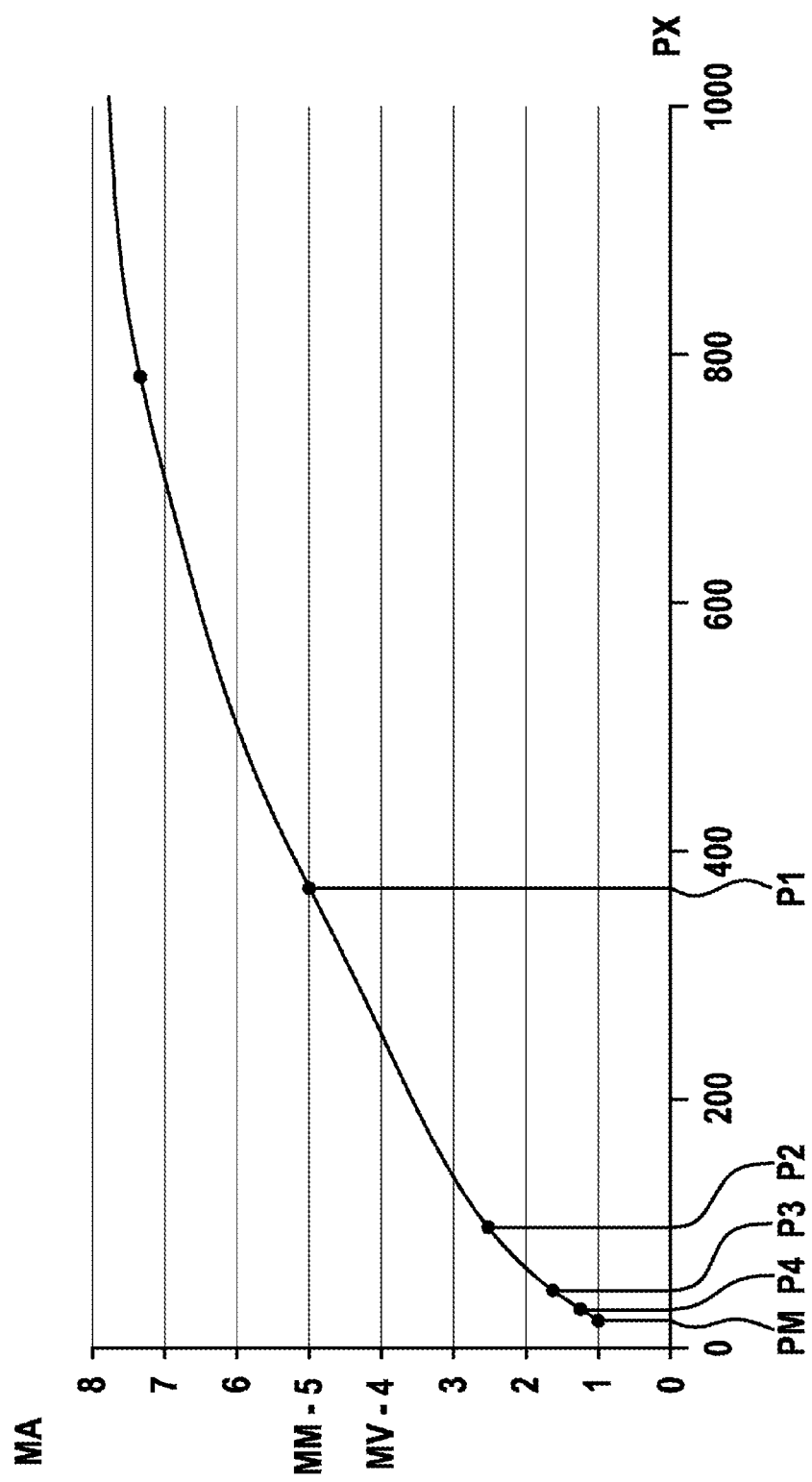
FIG. 2 shows a graphical representation of the dependency of the shut-off amount of a safety valve on an internal pressure in a tank.

FIG. 2 shows a graphical representation of the dependency of the shut-off amount MA of a safety valve 31, 32, 33, 34, 35 on an internal pressure PX in a tank 21, 22, 23, 24, 25. In this case, the internal pressure PX is plotted on the X-axis and the shut-off amount MA is plotted on the Y-axis. In the present case, the tanks 21, 22, 23, 24, 25 of the tank system 10 are of the same design and the safety valves 31, 32, 33, 34, 35 are also of the same design. The shut-off amounts MA of the safety valves 31, 32, 33, 34, 35 are also equal.

The consumer unit 12 requires no more than a full load amount MV of the gaseous substance. The safety valves 31, 32, 33, 34, 35 are adjusted so that the sum of the shut-off amounts MA of all the safety valves 31, 32, 33, 34, 35 for a minimum pressure PM corresponds to a maximum amount MM, which is greater than the full load amount MV.

The minimum pressure PM at which emptying the tanks 21, 22, 23, 24, 25 for supplying the consumer unit 12 is still possible amounts to 15 bar in the present case. In the present case, the full load amount MV is approximately 4 g/s. The shut-off amount MA of the safety valves 31, 32, 33, 34, 35 for the minimum pressure PM is approximately 1 g/s in the present case. The maximum amount MM is thus approximately 5 g/s in the present case.

In general, the following applies:

$$MM = N*MA(PM) > MV$$

At a first threshold value P1, in the present case approximately 375 bar, the shut-off amount MA of the safety valves 31, 32, 33, 34, 35 equals the maximum amount MM. At a second threshold value P2, in the present case approximately 94 bar, the shut-off amount MA of the safety valves 31, 32, 33, 34, 35 is half the maximum amount MM. At a third threshold value P3, in the present case approximately 42 bar, the shut-off amount MA of the safety valves 31, 32, 33, 34, 35 is a third of the maximum amount MM. At a fourth threshold value P4, in the present case approximately 23 bar, the shut-off amount MA of the safety valves 31, 32, 33, 34, 35 is a quarter of the maximum amount MM.

Figure 3:
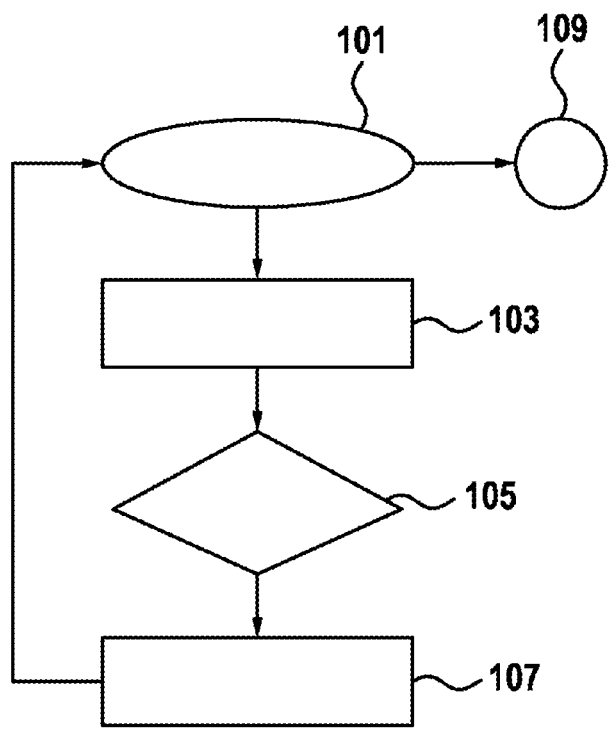
FIG. 3 shows a flow chart of a first operating strategy for the tank system.

FIG. 3 shows a flow chart of a first operating strategy for the tank system 10. Initially a first condition 101 is checked, according to which the internal pressure PX in at least one tank 21, 22, 23, 24, 25 exceeds the first threshold value P1.

If the first condition 101 is met, then in a first implementation step 103 exactly one of the tanks 21, 22, 23, 24, 25 is connected, the internal pressure PX of which exceeds the first threshold value P1. At the same time, the remaining tanks 21, 22, 23, 24, 25 are disconnected. After the first implementation step 103, exactly one tank 21, 22, 23, 24, 25 of the tank system 10 is thus connected.

Subsequently, in a first test step 105 the internal pressure PX is measured of the tanks 21, 22, 23, 24, 25 of the tank system 10 that are connected. If the internal pressure PX of the tank that is connected 21, 22, 23, 24, 25 still exceeds the first threshold value P1, said tank 21, 22, 23, 24, 25 remains connected.

If the internal pressure PX of the tank that is connected 21, 22, 23, 24, 25 is less than the first threshold value P1, then said tank that is connected 21, 22, 23, 24, 25 is disconnected in a first switching step 107.

Then the first condition 101 is checked again, according to which the internal pressure PX in at least one tank 21, 22, 23, 24, 25 exceeds the first threshold value P1. If the first condition 101 is still met, exactly one other tank 21, 22, 23, 24, 25, the internal pressure PX of which exceeds the first threshold value P1, is connected in the first implementation step 103.

During implementation of the first operating strategy for the tank system 10, exactly one of the tanks 21, 22, 23, 24, 25 of the tank system 10 is thus always connected. As a result, the tanks 21, 22, 23, 24, 25 are emptied successively but approximately uniformly. The internal pressure PX in the individual tanks 21, 22, 23, 24, 25 thus remains approximately equal while the first operating strategy is carried out.

If the first condition 101 is no longer met, i.e. if the internal pressure PX in each tank 21, 22, 23, 24, 25 is less than the first threshold value P1, then the operating strategy for the tank system 10 is changed in a first change step 109.

Figure 4:
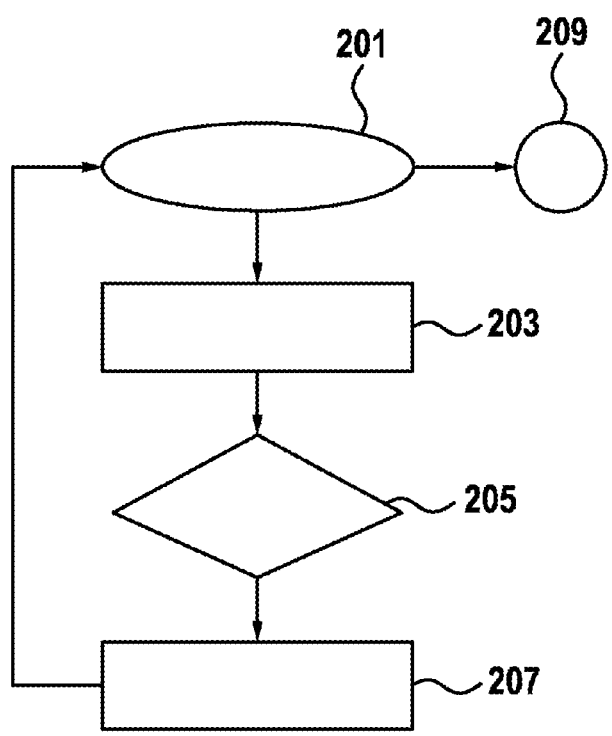
FIG. 4 shows a flow chart of a second operating strategy for the tank system and FIG. 5 shows a graphical representation of the dependency of the number of tanks that are connected on the internal pressure in the tanks.

FIG. 4 shows a flow chart of a second operating strategy for the tank system 10. In preparation, a second condition 201 is checked, according to which the internal pressure PX in all the tanks 21, 22, 23, 24, 25 is less than the first threshold value P1 and exceeds the second threshold value P2 in at least two tanks 21, 22, 23, 24, 25.

If the second condition 201 is met, then in a second implementation step 203 exactly two of the tanks 21, 22, 23, 24, 25, the internal pressure PX of which exceeds the second threshold value P2, are connected. At the same time, the remaining tanks 21, 22, 23, 24, 25 are disconnected. Following the second implementation step 203, exactly two tanks 21, 22, 23, 24, 25 of the tank system 10 are thus connected.

Subsequently, in a second test step 205 the internal pressure PX is measured of the tanks 21, 22, 23, 24, 25 of the tank system 10 that are connected. If the internal pressure PX of the tanks that are connected 21, 22, 23, 24, 25 still exceeds the second threshold value P2, said tanks 21, 22, 23, 24, 25 remain connected.

If the internal pressure PX of the tanks that are connected 21, 22, 23, 24, 25 is less than the second threshold value P2, then said tanks that are connected 21, 22, 23, 24, 25 are disconnected in a second switching step 207.

Then the second condition 201 is checked again, according to which the internal pressure PX in all the tanks 21, 22, 23, 24, 25 is less than the first threshold value P1 and exceeds the second threshold value P2 in at least two tanks 21, 22, 23, 24, 25. If the second condition 201 is still met, exactly two other tanks 21, 22, 23, 24, 25, the internal pressure PX of which exceeds the second threshold value P2, are connected in the second implementation step 203.

During the implementation of the second operating strategy for the tank system 10, exactly two of the tanks 21, 22, 23, 24, 25 of the tank system 10 are thus always connected. As a result, the tanks 21, 22, 23, 24, 25 are emptied successively but approximately uniformly. The internal pressure PX in the individual tanks 21, 22, 23, 24, 25 thus remains approximately equal while the second operating strategy is carried out.

If the second condition 201 is no longer met, i.e. if the internal pressure PX in each tank 21, 22, 23, 24, 25 is less than the second threshold value P2, then the operating strategy for the tank system 10 is changed in a second change step 209.

Similarly to the first and second operating strategies presented here, three, four or five tanks 21, 22, 23, 24, 25 are connected at the same time in further operating strategies that are not explicitly described here. A number i of the tanks that are connected is a function of the internal pressure PX in the tanks 21, 22, 23, 24, 25 in this case.

Figure 5:
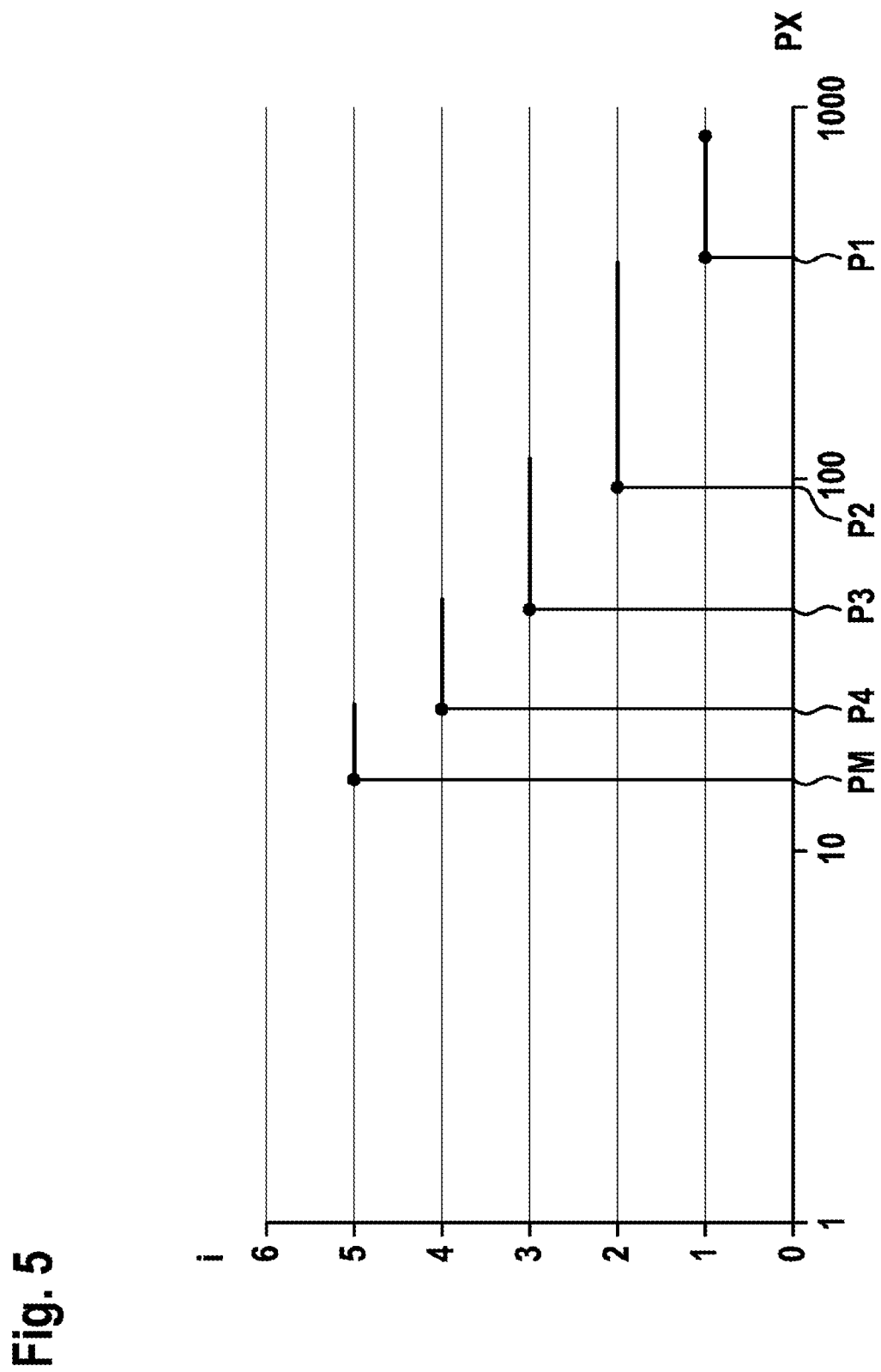

FIG. 5 shows a graphical representation of the dependency of the number i of the tanks that are connected 21, 22, 23, 24, 25 on the internal pressure PX in the tanks 21, 22, 23, 24, 25. In this case, the internal pressure PX is plotted on the X-axis and the number i of the tanks that are connected 21, 22, 23, 24, 25 is plotted on the Y-axis.

If the internal pressure PX in the tanks 21, 22, 23, 24, 25 exceeds the first threshold value P1, then at least one tank 21, 22, 23, 24, 25, preferably exactly one tank 21, 22, 23, 24, 25, is connected.

If the internal pressure PX in the tanks 21, 22, 23, 24, 25 is less than the first threshold value P1 and exceeds the second threshold value P2, then at least two tanks 21, 22, 23, 24, 25, preferably exactly two tanks 21, 22, 23, 24, 25, are connected.

If the internal pressure PX in the tanks 21, 22, 23, 24, 25 is less than the second threshold value P2 and exceeds the third threshold value P3, then at least three tanks 21, 22, 23, 24, 25, preferably exactly three tanks 21, 22, 23, 24, 25, are connected.

If the internal pressure PX in the tanks 21, 22, 23, 24, 25 is less than the third threshold value P3 and exceeds the fourth threshold value P4, then at least four tanks 21, 22, 23, 24, 25, preferably exactly four tanks 21, 22, 23, 24, 25, are connected.

If the internal pressure PX in the tanks 21, 22, 23, 24, 25 is less than the fourth threshold value P4 and exceeds the minimum pressure PM, then all five tanks 21, 22, 23, 24, 25 are connected.

The invention is not limited to the exemplary embodiments that are described here and the aspects that are emphasized therein. Rather, within the scope specified by the claims, a number of amendments that lie within the scope of expert actions are possible.

What is claimed is:

1. A method for operating a tank system for supplying a consumer unit, wherein the consumer unit requires no more than a full load amount of a gaseous substance, the method comprising
    providing the tank system comprising a plurality of tanks which are fluidly connectable, in parallel, to the consumer unit, wherein the tanks contain the gaseous substance at an internal pressure,
    providing each tank of the plurality of tanks with a respective safety valve that fluidly disconnects the tank from the consumer unit if a throughflow amount of the gaseous substance through the safety valve exceeds a shut-off amount,
    fluidly connecting to the consumer unit, when the internal pressure in at least one tank fluidly connected to the consumer unit is less than a first threshold value another tank that was not previously connected to the consumer unit, and
    fluidly disconnecting from the consumer unit, when the internal pressure in at least one of the tanks fluidly connected to the consumer unit exceeds the first threshold value, at least one tank other than the tank having the internal pressure that exceeds the first threshold value,
    wherein the fluidly connecting and the fluidly disconnecting result in a higher average internal pressure of the tanks connected to the consumer unit such that a leak of the gaseous substance through the safety valves is more easily detectable.

2. The method as claimed in claim 1, wherein
the safety valves are configured to shut off at a specified minimum pressure, which is lower than the first threshold value, and which is calculated such that a sum of the shut-off amounts of the safety valves of all the tanks for a minimum pressure is greater than the full load amount.

3. The method as claimed in claim 2, wherein
when the internal pressure in all the plurality of tanks exceeds the minimum pressured at least as many tanks are fluidly connected to the consumer unit such that the sum of the shut-off amounts of the safety valves of the tanks that are fluidly connected to the consumer unit is greater than the full load amount.

4. The method as claimed in claim 1, wherein
the first threshold value is calculated such that the shut-off amount of the safety valve at the first threshold value is greater than the full load amount.

5. The method as claimed in claim 4, wherein
when the internal pressure in at least one tank connected to the consumer unit exceeds the first threshold value, exactly one tank, the internal pressure of which exceeds the first threshold value, is fluidly connected to the consumer unit.

6. The method as claimed in claim 1, wherein
the exactly one tank is fluidly disconnected from the consumer unit when the internal pressure of the exactly one tank is less than the first threshold value.

7. The method as claimed in claim 1, wherein
when the internal pressure in all the plurality of tanks is less than the first threshold value and exceeds a second threshold value in at least two of the plurality tanks, exactly two of the plurality of tanks, the internal pressures of which are less than the first threshold value and exceed the second threshold value, are fluidly connected to the consumer unit.

8. The method as claimed in claim 7, wherein
the second threshold value is calculated such that the shut-off amount of the safety valves at the second threshold value is greater than half the full load amount.

9. The method as claimed in claim 7, wherein
the exactly two tanks are fluidly disconnected from the consumer unit if the internal pressure of both of the exactly two tanks is less than the second threshold value.

* * * * *